United States Patent [19]

Matsuoka

[11] Patent Number: 5,425,337
[45] Date of Patent: Jun. 20, 1995

[54] PRE-CHAMBER TYPE ENGINE

[75] Inventor: Hiroshi Matsuoka, Yamato, Japan

[73] Assignee: Izusu Ceramics Research Institute Co., Ltd., Kanagawa, Japan

[21] Appl. No.: 151,733

[22] Filed: Nov. 15, 1993

[30] Foreign Application Priority Data

Nov. 19, 1992 [JP] Japan .................................. 4-332209
Nov. 19, 1992 [JP] Japan .................................. 4-332210

[51] Int. Cl.⁶ ............................................. F02B 19/08
[52] U.S. Cl. .................................................. 123/262
[58] Field of Search ........................ 123/262, 276, 256

[56] References Cited

U.S. PATENT DOCUMENTS

| 3,132,633 | 5/1964 | Zimmerman | 123/262 |
| 4,522,172 | 6/1985 | Oshima et al. | 123/276 |
| 4,572,123 | 2/1986 | Evans | 123/262 |
| 4,799,465 | 1/1989 | Yanagisawa et al. | 123/256 |

FOREIGN PATENT DOCUMENTS

| 0455031 | 10/1991 | European Pat. Off. | 123/262 |
| 2406721 | 10/1978 | France | 123/262 |
| 471839 | 2/1929 | Germany | 123/262 |
| 676997 | 6/1939 | Germany | 123/262 |
| 2-112613 | 4/1990 | Japan | 123/262 |
| 307745 | 1/1930 | United Kingdom | 123/262 |

OTHER PUBLICATIONS

Patent Abstracts of Japan, vol. 14, Jul. 13, 1990. No. 2-112613(A).
Patent Abstracts of Japan, vol. 13, Oct. 6, 1989. No. 1-170745(A).

Primary Examiner—Raymond A. Nelli
Attorney, Agent, or Firm—Browdy and Neimark

[57] ABSTRACT

This pre-chamber type engine is provided with pre-chambers formed in the cavities in piston bodies, and head plates consisting of a material of a high thermal resistance the thermal expansion coefficient of which is substantially equal to that of the piston bodies and fixed to the piston bodies. The fuel injection nozzles project into the insert bores made in the head plates when the pistons are in positions in the vicinity of the top dead centers. The communication ports formed in the head plates extend in the portions thereof which are around the insert bores diagonally with respect to the axes of cylinders, and are spaced from one another in the circumferential direction thereof. The communication ports are formed so that the axes thereof are inclined in the direction opposite to the direction in which the swirl currents in the main chambers flow with the direction in which the gaseous mixture is ejected from the pre-chambers into the main chambers in agreement with that in which the swirl currents in the main chambers flow. Accordingly, the ejection currents from the pre-chambers into the main chambers enable the mixing thereof with fresh air to be promoted by utilizing the swirl currents in the cylinders.

19 Claims, 4 Drawing Sheets

PRE-CHAMBER TYPE ENGINE

BACKGROUND OF THE INVENTION

1. Field of the Invention

This invention relates to a pre-chamber type engine having main chambers, pre-chambers and fuel injection nozzles the injection ports of which are opened in the pre-chambers.

2. Description of the Prior Art

A swirl chamber type engine having swirl chambers has heretofore been developed for the purpose of improving the combustion in the engine. Such a swirl chamber type engine has swirl chambers formed in a cylinder head, communication ports via which the swirl chambers and main chambers formed in cylinders communicate with each other, and fuel injection nozzles provided in the swirl chambers, and the swirl currents flowing into the swirl chambers via the communication ports and a fuel injected into the swirl chambers form a gaseous mixture.

The swirl chamber type engines of this kind include as an example thereof a pre-chamber type structure disclosed in Japanese Patent Laid-open No. 12613/1990. In this pre-chamber type structure, the pre-chamber walls defining pre-chambers communicating with main combustion chambers formed in the cylinders via injection ports are formed out of an insulating material, and film members consisting of a ceramic material are provided on the inner surfaces of the pre-chamber walls. In this pre-chamber type structure, metal protective cylinders are fitted firmly over the outer circumferential surfaces of the pre-chamber walls. The injection ports allowing the main chambers to communicate with the pre-chambers are formed in a cylinder head incliningly with respect to the pre-chambers so as to promote the formation of swirl currents.

In general, the combustion temperature in a pre-chamber is high, so that it is effective to burn a gaseous mixture at a low air-fuel ratio for the purpose of reducing the generation of NOx. In order to burn a gaseous mixture at a low air-fuel ratio when the combustion temperature is high, an engine of a pre-chamber type structure is effectively used. In order to increase the combustion speed in a pre-chamber type combustion chamber in a pre-chamber type combustion chamber-carrying engine to a level substantially equal to that of the combustion speed in a direct injection type combustion chamber, it is necessary that the cross-sectional area of a communication port via which a pre-chamber and a main chamber communicate with each other be increased. However, when the cross-sectional area of the communication port is increased, the injection speed of a fuel from the pre-chamber into the main chamber decreases, and the combustion in the main chamber is not carried out satisfactorily.

In a conventional swirl chamber type engine, the rate of generation of NOx and smoke increases unless the direction in which a swirl current formed in a swirl chamber flows, the direction in which an atomized fuel is ejected from a fuel injection nozzle and the timing at which the fuel is thus ejected from the same nozzle all match. In a swirl chamber type engine, a communication port via which the pre-chamber and main chamber communicate with each other is small, so that a throttle loss due to the communication port occurs, which causes an engine output to decrease. In general, a communication port via which a main chamber and pre-chamber communicate with each other is provided in either the central portion of a cylinder or one spot of the outer circumferential portion thereof. This causes the distance over which an ejection current travels to increase, the sufficient mixing of the ejection current with the air in the main chamber to be prevented, HC and smoke to occur, the combustion time to be prolonged and the performance of the engine to lower. Since the communication port is restricted, the suction air entering the main chamber via the suction port and flowing into the pre-chamber through the communication port causes a strong swirl current to occur therein, and, due to this air flow, the heat transfer rate of the inner surface of the pre-chamber increases to cause an increase in the radiation rate.

In a direct injection engine having a combustion chamber in a piston, the volume ratio of the piston combustion chamber, i.e. a ratio of the volume of the piston combustion chamber to that of the whole combustion chamber at the end of a compression stroke is generally 65-80%, and the volume of a space not included in this percentage is called useless volume, attempts having been made to reduce the useless volume to the lowest possible level.

SUMMARY OF THE INVENTION

An object of the present invention is to solve these problems and provide a pre-chamber type engine capable of forming a cylinder head to a simple construction by providing pre-chambers in pistons; capable of reducing the distance over which the ejection currents from the pre-chambers travel, by forming the pre-chambers in the central portions of cylinders; capable of reducing a throttle loss occurring due to the provision of the communication ports, by increasing the cross-sectional area of the communication ports; capable of improving the performance of the engine by reducing the motion of the air in the pre-chambers to a suitable level, the heat transfer rate of the inner surfaces of the pre-chambers, the radiation rate therein and the length of the combustion time; and capable of promoting the mixing of fuel with the fresh air existing in the main chambers by ejecting, especially, a jet fuel from the pre-chambers into the main chambers in the direction in which the swirl currents formed in the pre-chambers flow, or in the direction which is perpendicular thereto.

In this pre-chamber type engine, a cavity forming a pre-chamber is made in the substantially central portion of a piston body constituting a piston, and a head plate covering the upper portion of the cavity is fixed to the piston body by casting. A main chamber is formed in a cylinder, and a fuel injection nozzle provided in the cylinder head is projected into an insert bore formed in the central portion of the head plate when the piston is in the vicinity of the top dead center. Communication ports via which the main chamber and pre-chamber communicate with each other are formed around the insert bore in the head plate so that the communication ports are inclined with respect to the axis of the cylinder and spaced from one another in the circumferential direction of the cylinder, and the head plate is form-out of a material of a high thermal resistance having a thermal expansion coefficient substantially equal to that of the piston body.

Another object of the present invention is to provide a pre-chamber type engine, in which pre-chambers provided in the pistons are formed in heat insulating structures so as to enable the temperature of the inner surfaces of the pre-chambers to increase, a difference between the temperature of the walls of the pre-chambers and that of a gas therein to lower, the temperature of the hot gas currents to decrease, the heat dissipation from the pre-chambers to the outside thereof to be prevented, and a thermal load on the pistons to be reduced. In this pre-chamber type engine, a mounting bore is formed in the central portion of a piston body, and a pre-chamber block formed out of a ceramic material and forming a pre-chamber via a heat insulating layer is fitted in this mounting bore. Since the pre-chamber block is fixed to the piston body with a coupling ring, the pre-chamber block is fixed firmly to the piston body. Since the pre-chamber in the piston is formed in a heat insulating structure, a thermal load on the piston can be reduced, and the occurrence of heat dissipation is prevented. This enables a gaseous mixture to be burnt at a low air-fuel ratio, the rate of generation of NOx to lower, and the thermal efficiency to be improved.

The cooling loss in a pre-chamber type engine is generally large for the following reasons. Providing a pre-chamber causes an increase in the surface area of the engine, the flow velocity of the air in the pre-chamber, the heat transfer rate thereof and temperature of the gas therein, so that the heat radiation rate becomes high. However, in a pre-chamber in the pre-chamber type engine according to the present invention, the heat radiation rate decreases greatly as mentioned previously as compared with that in a regular swirl chamber.

In the pre-chamber type engine according to the present invention, the direction in which a communication port is inclined is opposite to that of a swirl current formed in a cylinder due to the air flowing from a suction port into the relative main chamber, and the direction in which a fuel is ejected from the pre-chamber into the main chamber is in accordance with that of the flow of swirl current in the main chamber. Therefore, the energy of the swirl current formed in the mein chamber can be used effectively, and the mixing of combustion flames, unburnt gaseous mixture and fresh air together is promoted in the main chamber.

When the communication ports are inclined outward, the travel of the ejection current from the pre-chamber to the space around the piston becomes smaller, and the mixing of the ejection current with the fresh air around the piston is promoted excellently. A swirl current formed due to the suction air flowing from the suction port into the main chamber flows in a small amount first via the insert bore into the pre-chamber in accordance with an upward movement of the piston. When the free end portion of the fuel injection nozzle projects into the insert bore, so that the suction air in the cylinder is compressed, the compressed air makes a U-turn and advances as a vector flux via the communication ports into the pre-chamber by a final thrust movement of the fuel injection nozzle to form a swirl current flowing in the opposite direction in the pre-chamber. A liquid fuel, such as an alcohol fuel and a light oil is ejected from the multi-holes of the fuel injection nozzle into the pre-chamber, in which the fuel is burnt at a low air-fuel ratio to minimize the generation of NOx.

The combustion flames then expand in the pre-chamber and are ejected through the communication ports. Since the communication ports are arranged in the direction in which the swirl current in the cylinder flows, the combustion flames and unburnt gaseous mixture are ejected as they ride on the swirl current, i.e., as they utilize the swirl current effectively which remains at around 30% in the cylinder. The combustion flames and unburnt gaseous mixture are then mixed more finely with the fresh air to increase the combustion rate. The free end portion of the fuel injection nozzle comes out of the insert bore 30°–40° (crank angle) past the top dead center of a compression stroke, and the combustion flames and unburnt gaseous mixture are ejected from the insert bore as well to increase the thermal efficiency and complete the combustion of the gaseous mixture. Accordingly, the generation of HC and smoke in the main chamber is minimized.

When this pre-chamber type engine is so formed that the communication ports are inclined radially from the upper surface of the circumferential portion of a piston body toward the center of the cavity with the fuel ejected from the pre-chamber into the main chamber perpendicularly to the swirl current in the cylinder toward the circumferential portion of the piston body, the flames from the pre-chamber impinges upon the swirl current in the cylinder to promote the turbulence thereof, whereby the mixing of the suction air with the fuel can be promoted.

The residence time of the fuel injection nozzle in the pre-chamber, i.e. the time during which the insert bore is closed with the fuel injection nozzle projecting thereinto is determined on the basis of the length of the portion of the fuel injection nozzle which projects from the lower surface of the cylinder head and the thickness of the head plate or the upper portion of the pre-chamber block. Accordingly, the closing time can be controlled by properly setting the length of the projecting portion of the fuel injection nozzle and the thickness of the head plate or the upper portion of the pre-chamber block.

This pre-chamber type engine is provided with a pre-chamber in the central portion of a piston, an insert bore, into which a fuel injection nozzle can project in a position in the vicinity of the top dead center of the piston, in the central portion of a head plate or a pre-chamber block, and a plurality of communication ports, which allow a main chamber and the pre-chamber to communicate with each other, around the insert bore so that the communication ports are inclined with respect to the axis of a cylinder and spaced from one another in the circumferential direction of the cylinder. Therefore, the travel of an ejection current from the communication ports to the wall surface of the cylinder becomes shorter, and the combustion time decreases, so that the performance of the engine is improved. Since the travel of the election current from the pre-chamber to the cylinder wall can be reduced, the communication ports can be formed to a larger effective cross-sectional area, and a throttle loss can be reduced, this enabling the efficiency of the engine to be improved. Since the cross-sectional area of the passage between the main chamber and pre-chamber can be increased in total to a level which is determined by the sum of the cross-sectional areas of the plural communication ports formed in the outer circumferential portion of the pre-chambers, a throttle loss can be reduced. When the communication ports are inclined outward, the travel of an election current from the pre-chamber to the space around the piston further decreases, and the mixing of fuel with fresh air in the space around the piston is promoted.

Accordingly, in this pre-chamber type engine, it is possible to burn a gaseous mixture at a low air-fuel ratio in a pre-chamber, maintain a combustion rate therein at a level equal to that in a direct injection type combustion chamber and minimize the generation of NOx. Since the pre-chamber is formed in the central portion of the cylinder, the travel of the flames and gaseous mixture ejected from the outer circumferential portion of the pre-chamber becomes shorter with respect to the whole circumference of the cylinder, i.e. the fresh air in the main chamber. This enables the mixing of flames, gaseous mixture and suction air together in the main chamber to be promoted, the combustion rate therein to increase, the combustion time to be reduced, and the combustion operation to be carried out with the generation of NOx, HC and smoke minimized.

DESCRIPTION OF THE PREFERRED EMBODIMENTS

An embodiment of the pre-chamber type engine according to the present invention will now be described with reference to FIGS. 1 and 2.

This pre-chamber type engine has a cylinder block 6 consisting of a metal material, such as aluminum and an aluminum alloy, and a cylinder head 5 fixed to the cylinder block 6 via a gasket 27, such as a metal gasket and consisting of a metal material, such as an aluminum alloy. The cylinder block 6 is provided therein with bores 21 the number of which corresponds to that of the cylinders of the engine, and a cylinder liner 19 forming a cylinder 3 is fitted in each bore 21. The cylinder head 5 is provided therein with suction ports 13 and exhaust ports 17 the number of both of which corresponds to that of the cylinders of the engine, i.e. the cylinders 3. A suction valve 16 is disposed on a valve seat 22 in each suction port 13, and an exhaust valve 26 on a valve seat in each exhaust port 17. A piston 8 is installed in the cylinder 3 defined by the cylinder liner, in such a manner that the piston can be reciprocatingly moved therein. A main chamber 1 is formed between the lower surface 14 of the cylinder head and the top surface 15 of the piston.

This pre-chamber type engine is a diesel engine in which a liquid fuel, such as an alcohol fuel and a light oil is injected from a fuel injection nozzle 10 into a pre-chamber 2 and burnt, which engine is characterized in that a pre-chamber 2 is provided in a piston 8, a plurality of communication ports 9 being provided so as to extend inclininly. A volume ratio of the pre-chamber 2 formed in a piston body 18 to a total combustion chamber at the end of a compression stroke is set to 40-65%. The cylinder head 5 is provided in the portion thereof which is aligned with the axis of the cylinder with a through bore 23, in which a fuel injection nozzle 10 having multi-holes 11 is inserted and fixed, and an injection port, i.e. a free end portion 24 of the fuel injection nozzle 10 projects from the lower surface 14 of the cylinder head. The fuel injection nozzle 10 is capable of projecting at the free end portion 24 thereof into the pre-chamber 2 when the piston is in a position in the vicinity of the top dead center, and ejecting the fuel from the multi-holes 11 into the pre-chamber 2.

In this pre-chamber type engine, the piston 8 reciprocatingly moved in the cylinder 3 consists of a piston body 18 provided in the central portion thereof with a cavity 20 forming the pre-chamber 2, and a head plate 4 which is fixed by casting in a larger-diameter cavity portion, i.e. a casting bore 12 in the upper part of the cavity 20 in the piston body 18, and which forms an upper portion, which constitutes a part of a wall of the pre-chamber 2, of a piston bead. The bead plate 4 is formed out of a material of a high thermal resistance the thermal expansion coefficient of which is substantially equal to that of the material of the piston body 18. Accordingly, the head plate 4 is fixed firmly to the piston body 18. The head plate 4 is also provided in the central portion thereof with ar insert bore 7, into which an injection port, i.e. a free end portion 24 of the fuel injection nozzle 10 projects when the piston is in a position in the vicinity of the top dead center.

Figure 2:
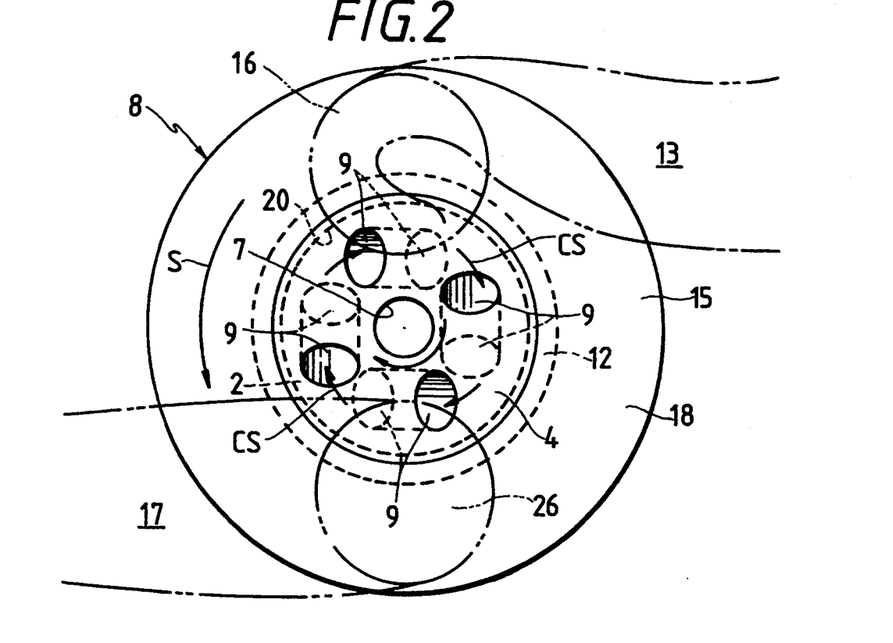
FIG. 2 is a plan view of an example of communication ports formed in a piston of the pre-chamber type engine shown in FIG. 1.

In order to establish communication between the main chamber 1 and the pre-chamber in this pre-chamber type engine, a plurality of communication ports 9 (for example, four communication ports in the embodiment shown in FIG. 2) are formed in the portion of the head plate which is around the insert bore 7 so as to extend diagonally with respect to the axis of the cylinder. These communication ports 9 are formed so as to be spaced from one another as shown in FIG. 2. The direction in which the communication ports 9 are inclined is opposite to that in which a swirl current S, which is formed by the air flowing from the suction port 13 into the main chamber 1, flows, and the direction in which the fuel is ejected from the pre-chamber into the main chamber 1 is in accordance with that in which a swirl current formed in the main chamber 1, i.e. the cylinder 3.

In this pre-chamber type engine, a part of the combustion chamber is formed as a pre-chamber 2, in which the initial combustion of a gaseous mixture, i.e. the primary combustion thereof is carried out at a high equivalent ratio, i.e., at a low air-fuel ratio, this enabling the generation of NOx to decrease. It is necessary that the gaseous mixture be then subjected to secondary combustion, i.e. recombustion by promoting the mixing of the fuel with the air in the main chamber 1 with the ejection energy from the pre-chamber. However, when a ratio (V/R) of the volume of the pre-chamber to a total volume of the combustion chamber becomes lower, the ejection energy decreases. In order to prevent the occurrence of this phenomenon in a conventional pre-chamber type engine, the cross-sectional area of a passage via which a pre-chamber communicates with a main chamber is reduced so as to increase the ejection energy. However, in a conventional pre-chamber type engine, the effective cross-sectional area of a communication port is generally somewhat less than 1.5% of the area of the top surface of a piston. Consequently, a throttle loss occurs during a fuel injection operation, and the engine efficiency lowers.

In the pre-chamber type engine according to the present invention, the effective cross-sectional area of the communication ports 9 is increased in view of these phenomena, and, in order to promote the mixing of the fresh air in the main chamber 1 with the ejection current from the pre-chamber, the communication ports 9 are formed in the portion of the head plate 4 which is away from the central insert bore 7 so as to be spaced from one another in the circumferential direction thereof, whereby the travel of an election current advancing from the pre-chamber to the wall surface of the cylinder 3 is reduced. Therefore, even when the ejection speed of the fuel from the communication ports 9 is low, the mixing of the fuel with the air in the main chamber 1 can be done excellently in a short period of time. Especially, when V/R becomes low, or, when the cross-sectional area of the communication ports becomes large, the ejection energy from the pre-chamber 2 to the main chamber 1 decreases. In order to ease this phenomenon, the fuel is elected from the outer circumferential portion of the pre-chamber. This allows the penetration of the election current to be effectively utilized, and the mixing of the fresh air in the main chamber 1 with the ejection current to be promoted.

In this pre-chamber type engine, the piston 8 forming the pre-chamber 2 therein is provided with the head plate 4 for closing the pre-chamber 2 and cylinder 3 with respect to each other. Accordingly, the combustion gas and gaseous mixture in the pre-chamber 2 are ejected in the direction, which is in conformity with the direction of the flow of the swirl current formed in the main chamber 1 and advancing from the communication ports 9 toward the outer circumferential portion of the piston 8, when the piston is in a position in the vicinity of the top dead center. Consequently, the mixing of the fuel ejected into the main chamber 1 with the air is promoted in a short period of time.

In this pre-chamber type engine, the head plate 4 is formed out of a material having a high thermal resistance and a thermal expansion coefficient substantially equal to that of the piston body 18, for example, Ni-resist, or a composite material consisting of ceramic whiskers, such as silicon carbide whiskers, and a metal, such as aluminum alloy. The head plate 4 can be set firmly in the larger-diameter cavity 12 by casting the piston body 18. Since the free end portion 24 of the fuel injection nozzle 10 is positioned in a region in which it is exposed to a high-temperature gas, the outer circumferential surface thereof is covered with a heat insulating material 25 by coating so as to shield the free end portion 24 against the heat.

This pre-chamber type engine is constructed as described above and operated in the following manner. In a suction stroke of the engine, the suction valve 16 is opened, and suction air flows via the suction port 13 into the cylinder 3 to form a swirl S therein. The swirl S is sent into the pre-chamber 2 through the communication ports 9 formed so as to be spaced from one another in the circumferential direction, in a compression stroke by the compressive force occurring due to the upward movement of the piston 8, to form a swirl CS in the pre-chamber 2 which advances in the reverse direction with respect to the swirl S. Namely, due to the compression of the suction air occurring when the piston 8 is moved up, the compressed air flows into the pre-chamber 2 through the communication ports 9 which are inclined in the direction opposite to the direction of flow of the swirl S in the cylinder 3. At this time, the compressed air having reversely directed velocity vector and forced into the pre-chamber is formed therein into a swirl current CS.

When the piston is in the vicinity of the terminal end of a compression stroke, the fuel is ejected from the multi-holes 11 of the fuel injection nozzle 10 into the pre-chamber 2, and this atomized fuel is mixed with the swirl CS therein to produce an inflammable gaseous mixture, which is ignited in the pre-chamber 2, a part of the gaseous mixture turns into flames, the rest being left in the state of an unburnt gaseous mixture, both the flames and unburnt gaseous mixture being ejected from the communication ports 9 toward the main chamber 1. During this time, the communication ports 9 only are opened into the main chamber 1 when the piston is in the vicinity of the top dead center TDC, so that the ejection current from the pre-chamber 2 is blown into the main chamber 1 through the communication ports 9. Since the communication ports 9 are inclined in the cylinder 3 in the direction in which the swirl S flows, the ejection current, i.e. the flames and unburnt gaseous mixture are blown out with the swirl current S left in the cylinder 3, in the direction of the flow of the swirl S without resisting the swirl S. The fuel injection nozzle 10 comes out of the insert bore 7 as the piston 8 is moved down, to cause the pre-chamber 2 to be opened in the main chamber 1 through the insert bore 7, so that the ejection current in the pre-chamber 2 is blown into the main chamber 1. The flames and unburnt gaseous mixture ejected into the main chamber 1 are mixed with the fresh air in the main chamber 1 in a short period of time, and the resultant gaseous mixture is secondarily burnt, i.e., after-burnt in a reduced combustion period of time to reduce the generation of HC and smoke. The operation proceeds to an exhaust stroke.

In this pre-chamber type engine, the communication ports 9 are formed along the outer circumference of the pre-chamber 2 to provide a large effective cross-sectional passage area. Accordingly, even when the penetration of the ejection current to be mixed with the fresh air in the main chamber 1 is short, the flames and gaseous mixture elected from the communication ports 9 can be mixed satisfactorily with the air in the main chamber 1. The communication ports 9 by which the main chamber 1 and pre-chamber 2 communicate with each other can be formed to provide a large total effective cross-sectional area, so that a throttle loss does not occur with the output level not decreasing. The pre-chamber 2 is formed concentrically with the axis of the cylinder 3, and the communication ports 9 in the outer circumferential wall of the pre-chamber 2. Accordingly, the ejection current from the pre-chamber 2 can be mixed with the air in the main chamber 1 satisfactorily in a short period of time even when the ejection energy and the travel of the ejection current are reduced due to the increased effective cross-sectional area of the communication ports 9, and the combustion time in the main chamber 1 decreases to enable the generation of HC and smoke to be minimized.

In this pre-chamber type engine, a fuel can be burnt at a low air-fuel ratio and a high combustion rate, so that the fuel can be burnt at a low rate of generation of NOx.

The ejection speed of the combustion gas produced by the flames and gaseous mixture flowing from the pre-chamber 2 into the main chamber 1 through the communication ports 9 decreases since the effective cross-sectional area of the communication ports 9 is large. However, since the communication ports 9 are positioned along a large circle with respect to the main chamber 1 formed around the pre-chamber 2, the distance between the communication ports 9 and the cylinder 3 as a whole decreases, and the flames and gaseous mixture ejected from the pre-chamber into the main chamber 1 through the communication ports 9 are mixed with the fresh air in the cylinder 3, i.e., around the main chamber 1 in a short period of time, so that the combustion rate can be reduced. Therefore, the combustion operation in even the main chamber 1 can be carried out with the generation of NOx, HC and smoke reduced.

Although this pre-chamber type engine is constructed as described above, the direction in which the communication ports 9 are inclined is not necessarily limited to that referred to above. The communication ports 9 between the main chamber 1 and the pre-chamber 2 can also be formed so as to be inclined as shown in FIG. 3 or 4.

Figure 3:
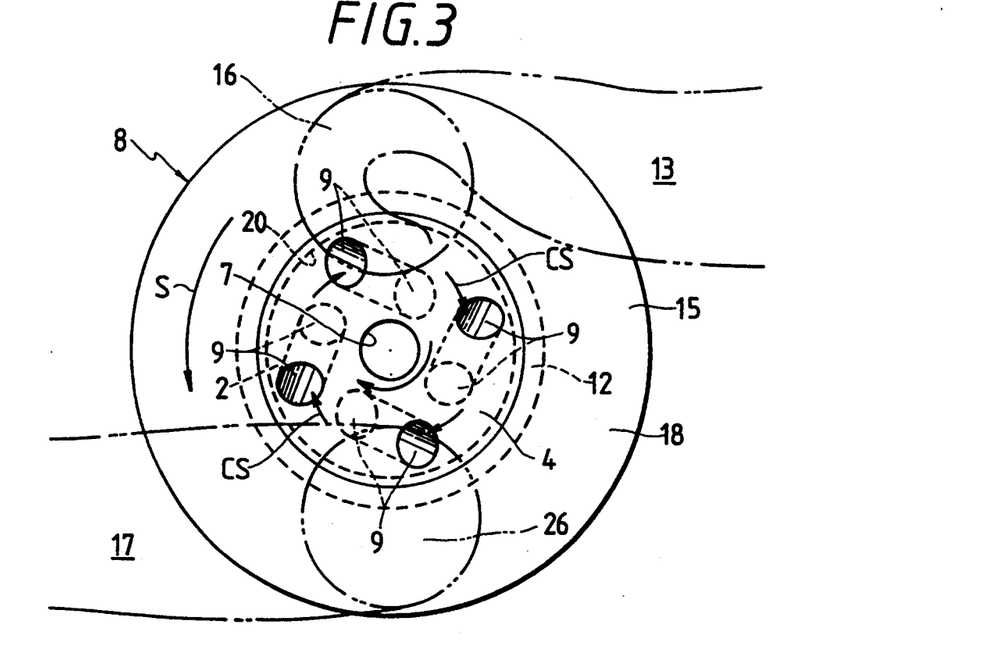
FIG. 3 is a plan view of another example of communication ports formed in a piston of the pre-chamber type engine shown in FIG. 1.

As shown in FIG. 3, the direction in which the communication ports between the main chamber 1 and the pre-chamber 2 are inclined is opposite as in the above-described embodiment to that of the swirl current formed by the air flowing from the suction port 13 into the main chamber 1, and the direction in which the fuel is ejected from the pre-chamber 2 into the main chamber 1 agrees with that in which the swirl current in the cylinder 3 flows. Also, as shown in FIG. 3, the communication ports 9 are inclined in the circumferential direction of the piston 8, i.e., in the outward direction. Since the communication ports 9 are inclined outward as mentioned above, the travel of the ejection current from the pre-chamber 2 to the space around the piston 8 becomes further shorter, and the mixing of the ejection current with the fresh air around the piston can be promoted.

Figure 4:
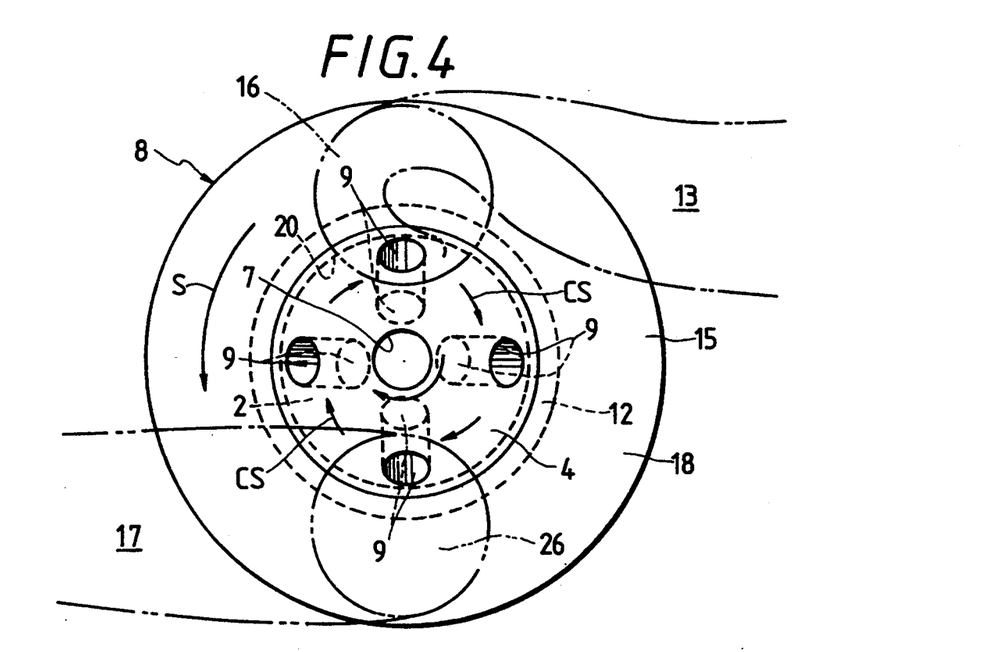
FIG. 4 is a plan view of still another example of communication ports formed in a piston of the pre-chamber type engine shown in FIG. 1.

As shown in FIG. 4, the inclined axes of the communication chambers 9 via which the main chamber 1 and pre-chamber 2 communicate with each other extend radially from the top surface of the circumferential portion of the piston body 18 toward the center of the pre-chamber 2, so that the direction in which the fuel is ejected from the pre-chamber 2 into the main chamber 1 crosses the swirl current in the cylinder 3, i.e, the ejection current flows toward the circumference of the piston body 18. When the engine is constructed so that the ejection current flows at right angles to the swirl current in the cylinder 3, the flames from the pre-chamber 2 impinges upon the swirl current in the cylinder 3 to render it possible to promote the turbulence of the fuel and air and the mixing thereof.

Another embodiment of the pre-chamber type engine according to the present invention will now be described with reference to FIGS. 5 and 6. The pre-chamber type engine of this embodiment has the same construction and function as the pre-chamber type engine described with reference to FIGS. 1 and 2 except that a pre-chamber is formed in a pre-chamber block, which is fixed to a piston body 18. Therefore, the same parts are designated by the same reference numerals, and duplicate descriptions thereof are omitted.

Figure 5:
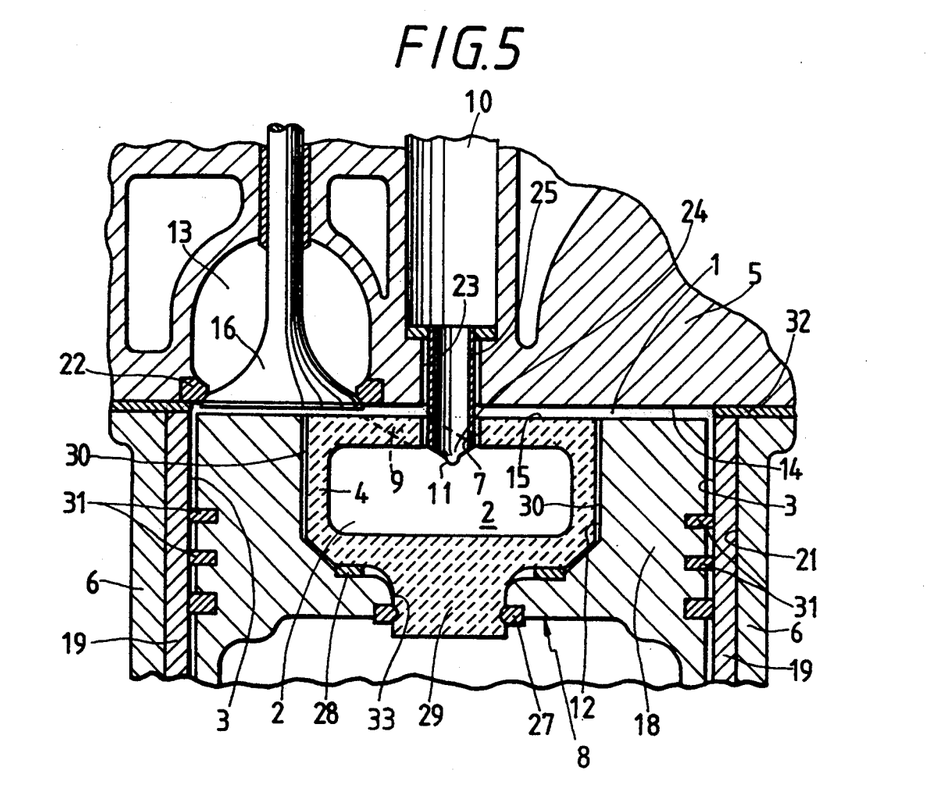
FIG. 5 is a sectional view of another embodiment of the pre-chamber type engine according to the present invention.
Figure 6:
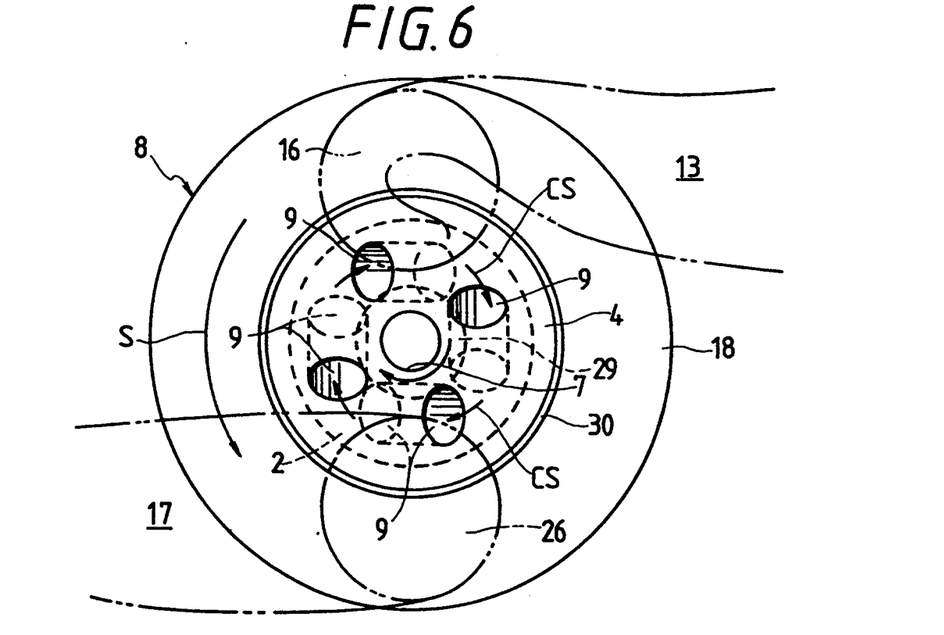
FIG. 6 is a plan view of an example of communication ports formed in a piston of the pre-chamber type engine shown in FIG. 5.

In the pre-chamber type engine of FIGS. 5 and 6, a piston 8 reciprocatingly moved in a cylinder 3 consists of a piston body 18 provided in the central portion thereof with a cavity 12 and a mounting bore 33, a pre-chamber block 4 fitted in the cavity 12 via a heat insulating layer, forming a pre-chamber 2 and formed out of a ceramic material, a projection 29 provided on the pre-chamber block 4, and a coupling ring 27 for fitting the projection 29 in the mounting bore 33 and fixed to the piston body 18. The piston body 18 and pre-chamber block 4 can be fixed to each other by the coupling ring 27 which is produced by plastically fluidizing a metal flow metal with heat. Accordingly, the pre-chamber block 4 can be fixed firmly to the piston body 18 by means of the coupling ring 27. The heat insulating layer mentioned above consists of a heat insulating air layer 30 formed between the outer circumferential surface of the pre-chamber block 4 and the inner circumferential surface of the cavity 12, and a heat insulating gasket 28 provided between the lower surface of the pre-chamber block 4 and the bottom surface of the cavity 12. The heat insulating gasket 28 is formed out of a material of a high strength and a low heat conductivity, such as partially stabilized zirconia. Since a heat insulating layer consisting of the heat insulating air layer 30 and heat insulating gasket 28 is formed between the pre-chamber block 4 and the cavity 12 in the piston body 18, the pre-chamber 2 has a heat insulating structure and prevents the heat energy in the pre-chamber 2 from being radiated therefrom and through the piston body 18 and piston ring 31.

In this pre-chamber type engine, communication ports (for example, four communication ports in the embodiment of FIG. 6) 9 are formed in the portion of the pre-chamber block 4 which is around the insert bore 7 so as to extend diagonally with respect to the axis of the cylinder and allow the main chamber 1 and pre-chamber 2 to communicate with each other. These communication ports 9 are formed in a circumferentially spaced manner as shown in FIG. 6. The direction in which the communication ports 9 are inclined is opposite to that in which the swirl current flows which is formed by the air flowing from the suction port 13 into the main chamber 1, and the direction in which the fuel is ejected from the pre-chamber 2 into the main chamber 1 is in agreement with that in which the swirl current S flows which is formed in the main chamber 1, i.e. the cylinder 3. The pre-chamber block 4 is provided in the central portion thereof with an insert bore 7, into which an injection hole portion, i.e. a free end portion 24 of a fuel injection nozzle 10 projects when a piston is in a position in the vicinity of the top dead center thereof.

In this pre-chamber type engine, the pre-chamber block 4 closing the pre-chamber 2 and cylinder 3 is provided in the piston 8 forming the pre-chamber 2. Therefore, when the piston is in a position in the vicinity of the top dead center, the combustion gas and gaseous mixture in the pre-chamber 2 are ejected toward the outer circumferential portion of the piston 8 in the direction which is in agreement with that in which the swirl current S flows which is formed between the communication ports 9 and main chamber 1. Consequently, the mixing of the gaseous mixture ejected into the main chamber 1 with the air is promoted in a short period of time. The pre-chamber block 4 is formed out of a composite material consisting of highly thermal-resistant silicon nitride, silicon carbide or ceramic whiskers and a metal, or a heat resisting metal consisting of Ni—Cr.

Figure 1:
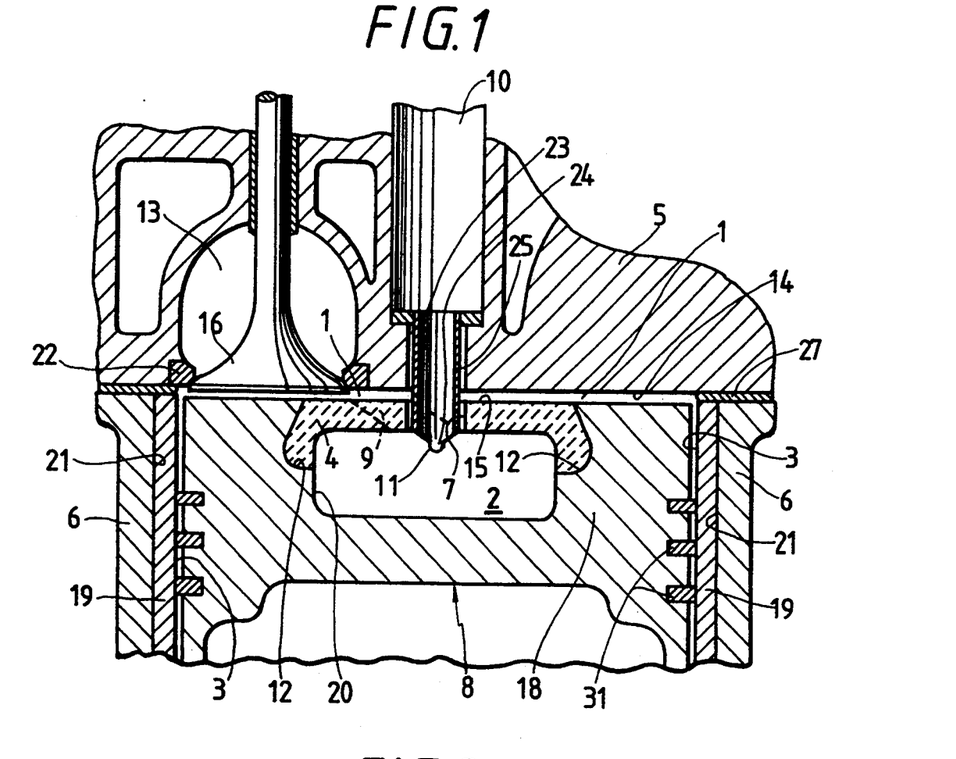
FIG. 1 is a sectional view of an embodiment of the pre-chamber type engine according to the present invention.

The pre-chamber type engine of this ,embodiment constructed as described above has substantially the same operation as the pre-chamber type engine shown in FIGS. 1 and 2 except that it has an operational effect resulting from the heat insulating construction of the pre-chamber 2. Therefore, the descriptions of the portions of the operation of the embodiment of FIGS. 5 and 6 which are identical with any portions of the operation of the embodiment of FIGS. 1 and 2 are omitted.

This pre-chamber type engine is formed so as to make it possible to reduce the thermal load on the piston 8 by providing the piston 8 with a pre-chamber of a heat-insulating structure therein, generate an excellent swirl in the pre-chamber 2 by increasing the heat transfer rate of the inner surface thereof, and prevent the heat from being diffused from the pre-chamber 2 to the outside. Since this pre-chamber type engine is formed by making a mounting bore 33 in the central portion of the piston body 18, fitting a pre-chamber block 4 forming the pre-chamber 2 therein and consisting of a ceramic material in the mounting bore 33 via the heat insulating air layer 30, and fixing the pre-chamber block 4 to the piston body 18 by the coupling ring 27, it becomes possible to fix the pre-chamber block 4 to the piston body 18 firmly, reduce the thermal load on the piston 8 by forming the pre-chamber 2 in a heat insulating structure in the piston 8, prevent the diffusion of heat from the pre-chamber 2 to the piston body 18, reduce the generation rate of NOx by burning the gaseous mixture at a low air-fuel ratio, and improve the thermal efficiency. On the other hand, a conventional pre-chamber type engine has a high cooling loss because the provision of a pre-chamber causes an increase in the surface area of the engine, and an increase in the fluidity of the air in the pre-chamber, heat transfer rate thereof, temperature of the gas therein and heat radiation rate therein.

Figure 7:
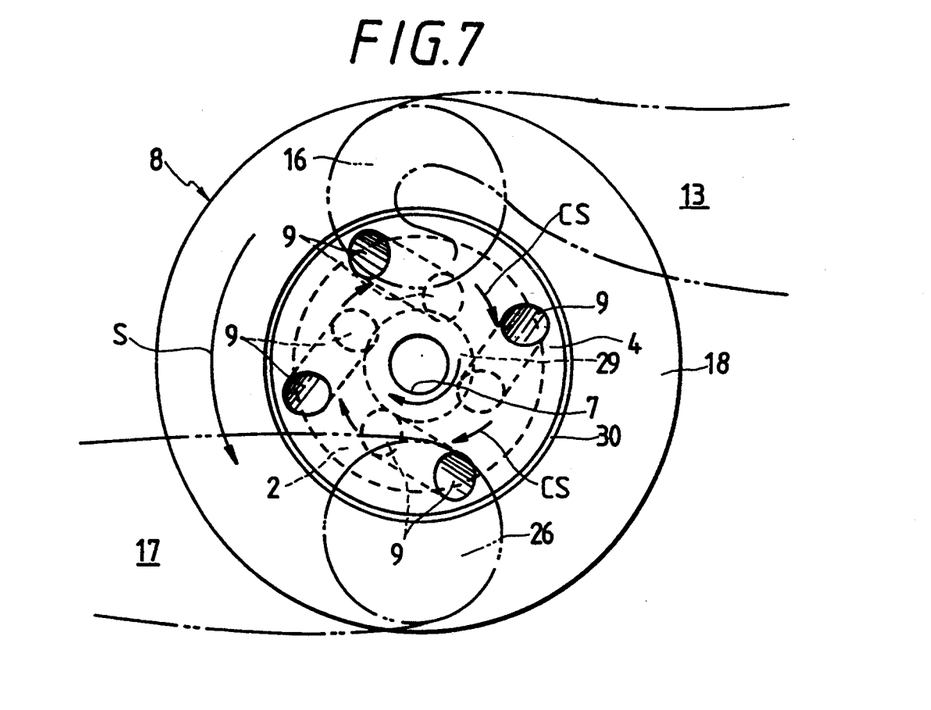
FIG. 7 is a plan view of another example of communication ports formed in a piston of the pre-chamber type engine shown in FIG. 5.
Figure 8:
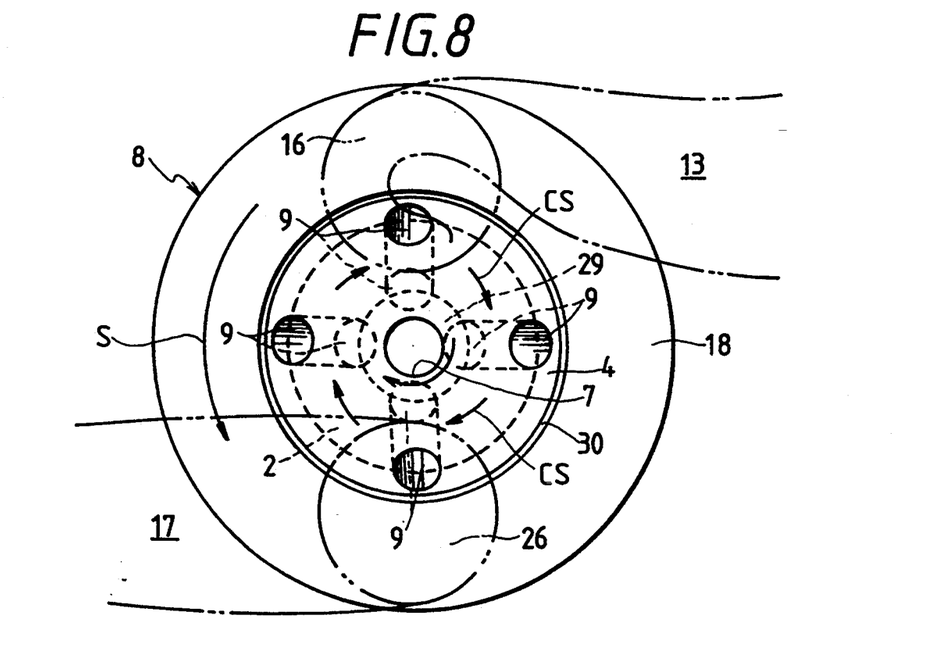
FIG. 8 is a plan view of still another example of communication ports formed in a piston of the pre-chamber type engine shown in FIG. 5.

Although this pre-chamber type engine is constructed as described above, the direction in which the communication ports are inclined is necessarily limited to that referred to above. The communication ports via which the main chamber communicates with the pre-chamber can also be formed so as to be inclined as shown in FIG. 7 or 8. Since the communication ports shown in FIG. 7 or 8 have construction and operation substantially identical with those of the communication ports shown in FIG. 3 or 4, the descriptions thereof are omitted.

What is claimed is:

1. A pre-chamber type engine comprising:
a cylinder block provided with cylinders forming main chambers,
a cylinder head fixed to said cylinder block and provided with suction and exhaust ports,
piston bodies provided with piston heads constituting pistons reciprocatingly moved in said cylinders,
pre-chambers consisting of cavities formed in the substantially central portions of said piston heads,
head plates constituting parts of the upper portions of said piston heads and fixed to said piston bodies so as to close said cavities,
insert bores positioned in the central portions of said cavities and formed in said head plates,
fuel injection nozzles provided in said cylinder head and adapted to project into said insert bores when said pistons are in positions in the vicinity of the top dead centers, a fuel ejected from multi-holes provided in said fuel injection nozzles being sprayed into said pre-chambers, and
communication ports, via which said main chambers communicate with said pre-chambers, formed in the parts of said head plates which are around said insert bores so as to be spaced from one another in the circumferential direction of said insert bores and inclined with respect to the axes of said cylinders.

2. A pre-chamber type engine according to claim 1, wherein said head plates are formed out of a material of a high heat resistance the thermal expansion coefficient of which is substantially equal to that of said piston bodies.

3. A pre-chamber type engine according to claim 1, wherein said head plates are formed out of Ni-resist.

4. A pre-chamber type engine according to claim 1, wherein said head plates are formed out of a composite material consisting of a ceramic material and a metal.

5. A pre-chamber type engine according to claim 1, wherein said head plates are fixed to said piston bodies by casting the latter, and constitute parts of walls of said pre-chambers.

6. A pre-chamber type engine according to claim 1, wherein a volume ratio of said pre-chambers to said main chambers is not more than 65%.

7. A pre-chamber type engine according to claim 1, wherein said insert bores are substantially closed with said fuel injection nozzles when the latter project into the former.

8. A pre-chamber type engine according to claim 1, wherein the length of a period of time during which said insert bores are closed with said fuel injection nozzles projecting thereinto is determined by the length by which said fuel injection nozzles project from said cylinder head and the depth of said insert bores, the length of combustion time in said pre-chambers being determined by that of said time of closure of said insert bores.

9. A pre-chamber type engine according to claim 1, wherein said communication ports are formed so that the axes thereof are inclined in the direction opposite to the direction in which the swirl currents formed in said cylinders by the air flowing from said suction ports into said main chambers advance with the direction in which a gaseous mixture is ejected from said pre-chambers into said main chambers in agreement with that in which said swirl currents in said cylinders flow.

10. A pre-chamber type engine according to claim 1, wherein said communication ports are formed so that the axes thereof extend radially from the upper surfaces of the circumferential portions of said piston bodies toward the centers of said cavities with said gaseous mixture ejected from said pre-chambers into said main chambers toward the circumferential portions of said piston bodies in diagonal direction so as to cross said swirl currents in said cylinders at right angles thereto.

11. A pre-chamber type engine comprising:
a cylinder block provided with cylinders forming main chambers,
a cylinder head fixed to said cylinder block and provided with suction and exhaust ports,
piston bodies provided with piston heads constituting pistons reciprocatingly moved in said cylinders,
cavities formed in the substantially central portions of the upper parts of said piston heads with mounting bores formed in the portions of said piston bodies which form the bottom surfaces of said cavities, pre-chamber blocks provided in said cavities, fitted in and fixed to said mounting bores and forming pre-chambers, the upper surfaces of said pre-chamber blocks being flush with those of said piston heads, heat insulating layers provided between said pre-chamber blocks and said cavities, said pre-chambers being formed in heat insulating structures by said heat insulating layers, fuel injection nozzles provided in said cylinder head and adapted to project into insert bores, which are formed in the central portions of said pre-chamber blocks, when said pistons are in positions in the vicinity of the top dead centers, a fuel ejected from multi-holes provided in said fuel injection nozzles being sprayed into said pre-chambers, and communication ports, via which said main chambers communicate with said pre-chambers, formed in the parts of said pre-chamber blocks which are around said insert bores so as to be spaced from one another in the circumferential direction of said insert bores and inclined with respect to the axes of said cylinders.

12. A pre-chamber type engine according to claim 11, wherein said pre-chamber blocks are provided at the lower portions thereof with projections, which are fixed to said piston bodies in a mounting bore-fitted state.

13. A pre-chamber type engine according to claim 11, wherein said pre-chamber blocks are formed out of a ceramic material having a high thermal resistance.

14. A pre-chamber type engine according to claim 11, wherein said heat insulating layers consist of heat insulating air layers formed between the outer circumferential surfaces of said pre-chamber blocks and the inner circumferential surfaces of said cavities, and heat insulating gaskets provided between the lover surfaces of said pre-chamber blocks and the bottom surfaces of said cavities.

15. A pre-chamber type engine according to claim 11, wherein said communication ports are formed so that the axes thereof are inclined in the direction opposite to the direction in which the swirl currents formed in said cylinders by the air flowing from said suction ports into said main chambers advance with the direction in which a gaseous mixture is ejected from said pre-chambers into said main chambers in agreement with that in which said swirl currents in said cylinders flow.

16. A pre-chamber type engine according to claim 11, wherein said communication ports are formed so that the axes thereof extend radially from the upper surfaces of the circumferential portions of said piston bodies toward the centers of said cavities with said gaseous mixture ejected from said pre-chambers into said main chambers toward the circumferential portions of said listen bodies in a diagonal direction so as to cross said swirl currents in said cylinders at right angles thereto.

17. A pre-chamber type engine according to claim 11, wherein said insert bores are substantially closed with said fuel injection nozzles when the latter project into the former.

18. A pre-chamber type engine according to claim 11, wherein the length of a period of time during which said insert bores are closed with said fuel injection nozzles projecting thereinto is determined by the length by which said fuel injection nozzles project from said cylinder head and the depth of said insert bores, the length of combustion time in said pre-chambers being determined by that of said time of closure of said insert bores.

19. A pre-chamber type engine according to claim 11, wherein a volume ratio of said pre-chambers to said main chambers is not more than 65%.

* * * * *